May 28, 1929.  D. L. DAPONTE  1,714,849
STEREOSCOPIC CINEMATOGRAPHY
Filed March 26, 1924   14 Sheets-Sheet 1
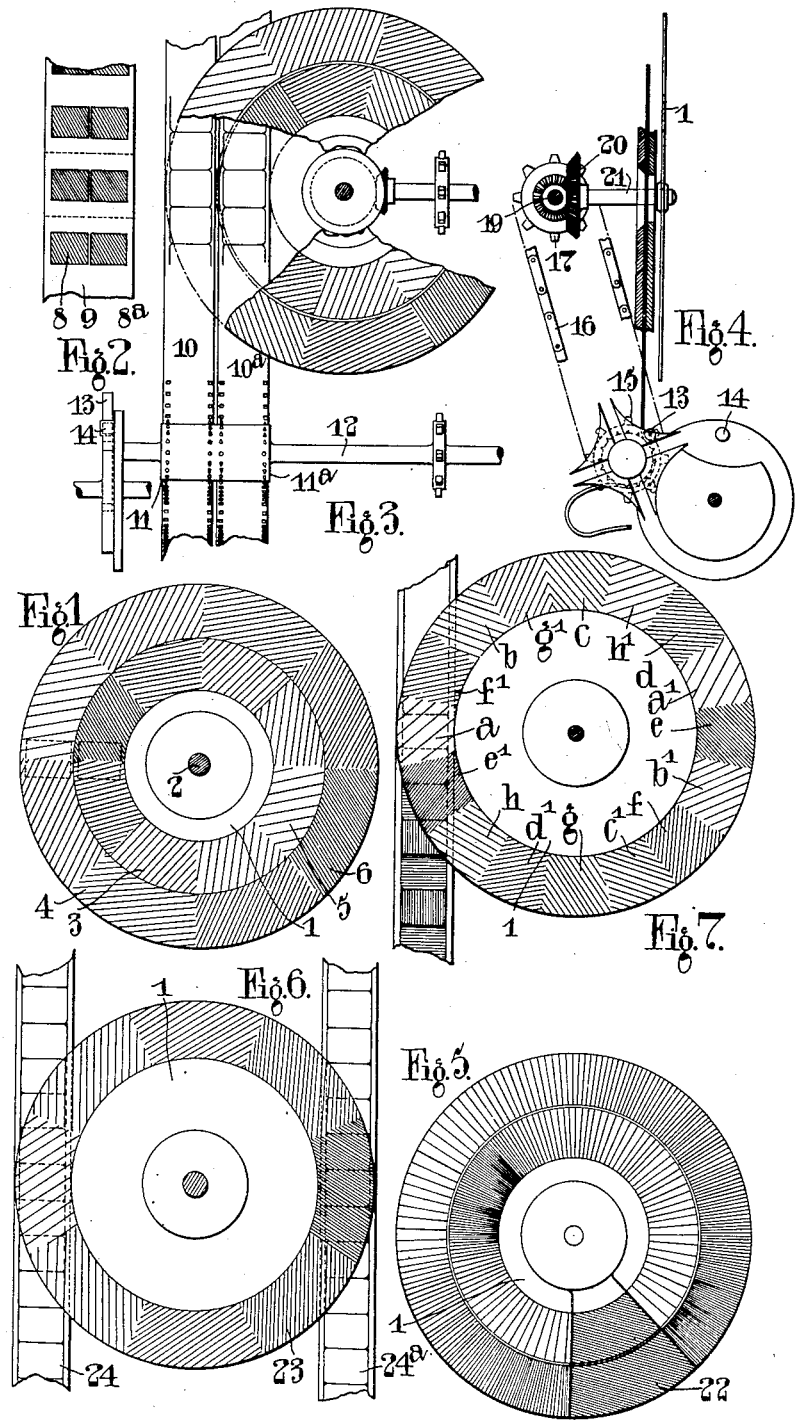

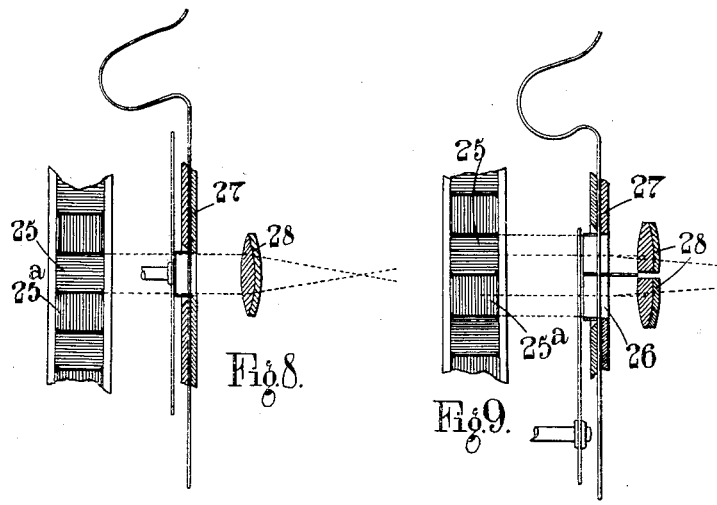
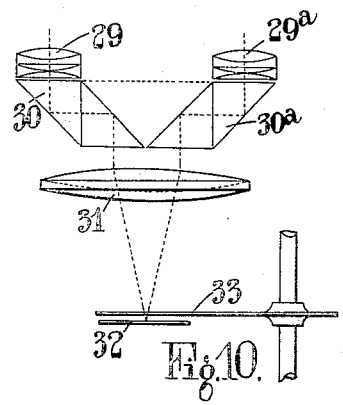
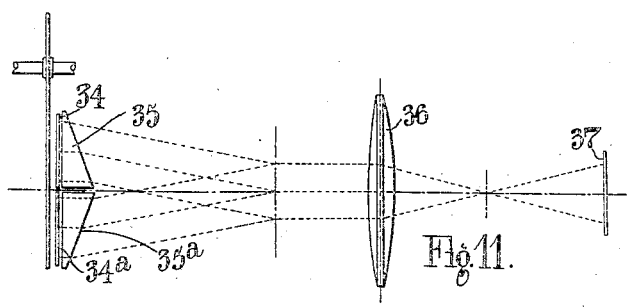

May 28, 1929.  D. L. DAPONTE  1,714,849
STEREOSCOPIC CINEMATOGRAPHY
Filed March 26, 1924    14 Sheets-Sheet 3
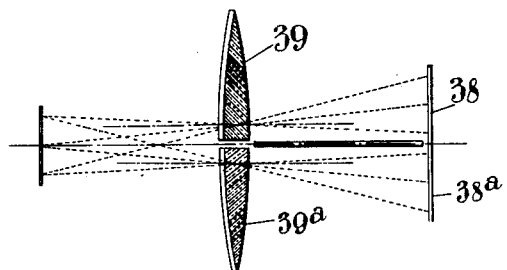
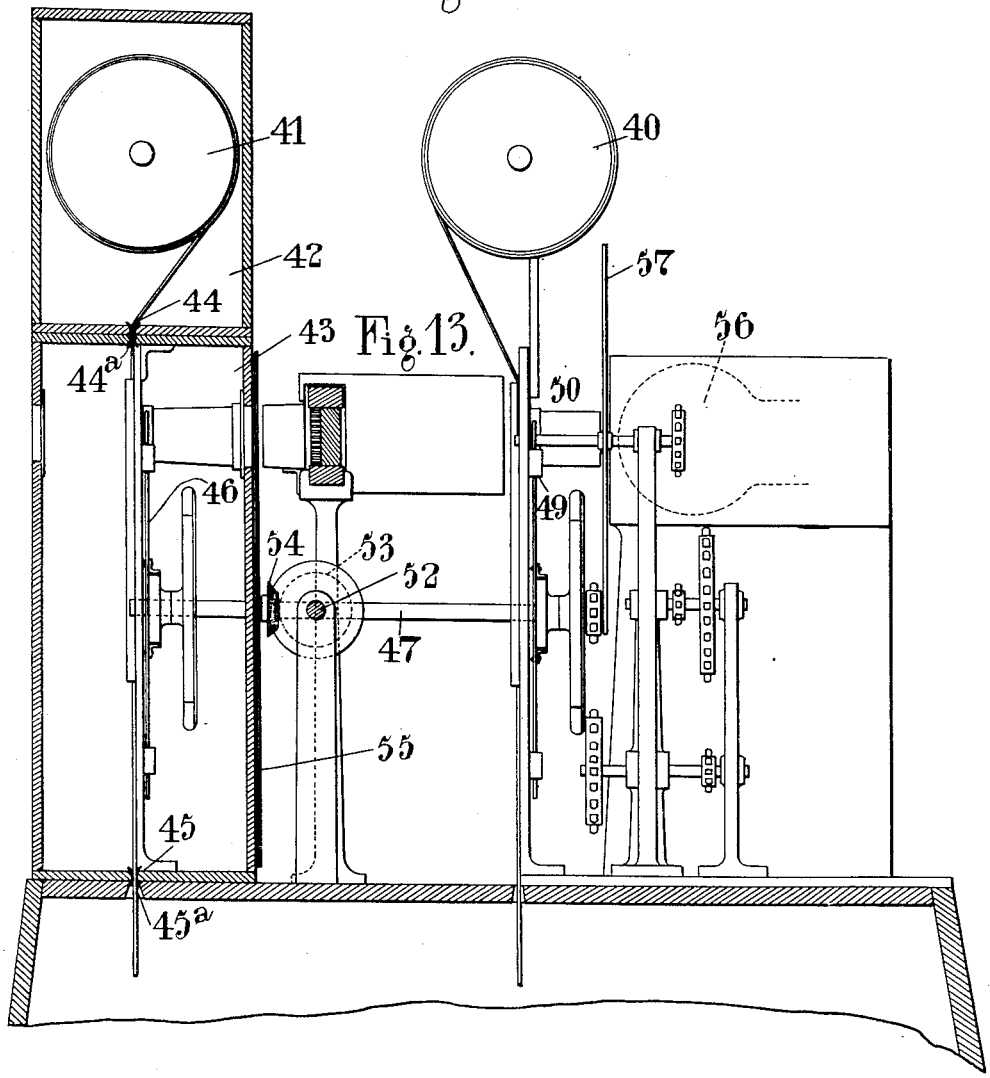
Inventor
D. L. Daponte
By Marks & Clerk
Attys.

May 28, 1929.　　　　D. L. DAPONTE　　　1,714,849
STEREOSCOPIC CINEMATOGRAPHY
Filed March 26, 1924　　14 Sheets-Sheet 4

May 28, 1929. D. L. DAPONTE 1,714,849
STEREOSCOPIC CINEMATOGRAPHY
Filed March 26, 1924 14 Sheets—Sheet 6

Inventor
D. L. Daponte
By Marks v Clerk
Attys.

May 28, 1929.　　　D. L. DAPONTE　　　1,714,849
STEREOSCOPIC CINEMATOGRAPHY
Filed March 26, 1924　　14 Sheets-Sheet 8

May 28, 1929.  D. L. DAPONTE  1,714,849
STEREOSCOPIC CINEMATOGRAPHY
Filed March 26, 1924   14 Sheets-Sheet 10

Inventor
D. L. Daponte
By Marks & Clerk
Attys

May 28, 1929.  D. L. DAPONTE  1,714,849
STEREOSCOPIC CINEMATOGRAPHY
Filed March 26, 1924   14 Sheets-Sheet 12

Inventor
D. L. Daponte
By Marks & Clerk
Attys.

May 28, 1929.  D. L. DAPONTE  1,714,849

STEREOSCOPIC CINEMATOGRAPHY

Filed March 26, 1924   14 Sheets-Sheet 13

Inventor
D. L. Daponte
By Marks & Clerk
Attys.

May 28, 1929.　　　D. L. DAPONTE　　　1,714,849
STEREOSCOPIC CINEMATOGRAPHY
Filed March 26, 1924　　14 Sheets-Sheet 14

Inventor
D. L. Daponte
By Marks & Clerk
Attys.

Patented May 28, 1929.

1,714,849

UNITED STATES PATENT OFFICE.

DEMETRIUS LEONIDA DAPONTE, OF LONDON, ENGLAND.

STEREOSCOPIC CINEMATOGRAPHY.

Application filed March 26, 1924, Serial No. 702,099, and in Great Britain March 29, 1923.

This invention relates to the production of stereoscopic effects and particularly to stereoscopic cinematography.

Numerous attempts have been made to secure a stereoscopic effect in connection with cinematography but so far these attempts have not met with any considerable success on a practical scale.

It has been shown that a stereoscopic effect may be obtained in cinematograph projection without using any arrangement for simultaneously projecting two stereoscopically related images.

When two stereoscopically related images are, for instance, projected alternately on to the screen a stereoscopic effect may be obtained, but the observer will at the same time perceive an oscillatory movement of the projected image due to the substitution of the left-hand for the right-hand picture and vice versa. The slower is the rate of alternation of the projection of the individual members of the pairs of stereoscopically related images the more apparent will be the oscillatory motion. If the speed of alternation is suitably increased the appearance of oscillation may be considerably minimized but by a further increase of speed the phenomenon of persistence of vision results in the same effect being produced as if the two images were simultaneously projected; in other words, the appearance of two superposed images slightly displaced relatively to one another will be secured and a stereoscopic effect will not be obtained. There is a critical speed at which either the oscillatory movement nor what may be described as the "superposition" effect are apparent and which, therefore, results in obtaining a true stereoscopic effect. It is, however, difficult to maintain this speed of projection exactly with ordinary cinematograph projection machines and it is here referred to only as a possible solution of the problem from what may be described as the theoretical point of view.

The object of the present invention is to provide an improved method of securing a stereoscopic effect which shall be conveniently applicable to practical requirements.

One feature of the invention consists in alternately diminishing and increasing gradually the intensity of illumination, brilliance or sharpness of definition of the image of one member of a plurality of stereoscopically related views thus securing, as it were, pulsation in the illumination or sharpness of definition of the projected image.

Preferably, both members of a pair—or two or more of the members of a plurality of views if the total number of members is greater than two—are correspondingly projected with alternately increasing and decreasing intensity of illumination or sharpness of definition of the projected image.

Thus, in accordance with the invention, a gradual transition from one view into another may be secured.

For instance, the transition from one member to another may be secured progressively so that from the moment when the first member is fully visible or is at its maximum brilliance, intensity or sharpness of definition, it fades away as a whole, that is over its whole area, or locally, while the other member is rendered increasingly visible by reason of its increase in brilliance, intensity of illumination or sharpness of definition.

Thus this phase of the invention in one form may be stated to comprise causing a member or certain members of a plurality of stereoscopically related views to decrease in intensity of illumination, brilliance or sharpness of definition and causing another member or other members to increase in intensity of illumination, brilliance or sharpness of definition.

This may be effected in accordance with the invention by the employment of any suitable means adapted to secure the diminution in the brillliancy or intensity of illumination or definition of the image of one member of a plurality of stereoscopically related views and the increase in the brilliancy or intensity of illumination or definition of the image of another member or other members thereof.

It is, however, undesirable in dissolving the image of one member of a pair of stereoscopically related views into the image of the other member of the pair that at any time either of the members should completely disappear.

This phase of the invention includes broadly a method of producing stereoscopic effects which relies upon rendering one of, for instance, a pair of stereoscopically related views more distinctly observable to the eye and correspondingly reducing the visibility or distinctness of the other member of a pair of stereoscopically related views but preferably without ever completely suppressing either of the two views unless also the other view is suppressed, the suppression of both of the views being, of course, necessary when the invention is applied to cinematography by the employment of a film or films moved in a stepwise manner through projectors of the usual construction.

For example, in accordance with this phase of the invention a cinematograph film having stereoscopically related views printed in pairs side by side, as prints of equal depth or intensity, may be employed in conjunction with means adapted to diminish gradually the intensity or brilliance of the projected image of one member of a pair and gradually increase the intensity or brilliance of the image of the other member.

To this end, a screen of graduated opacity or light-absorbing power may be employed for securing the diminution in intensity of illumination or area of illuminated surface of one of the images and correspondingly increasing the intensity or area of the illuminated surface of the other image.

The screen may, for instance, be conveniently rotatably mounted and be provided with arcuate bands of graduated opacity or light-absorbing power so disposed relatively to the projector lenses as simultaneously to diminish the intensity of light passing through one member of a pair of stereoscopically related views and correspondingly increase the intensity of light passing through the illuminated area of the other member.

When employing "screens" of graduated opacity, rotatably or otherwise mounted to vary the intensity of illumination of the projected image, the maximum opacity of the screen or screens should preferably never be so great as completely to cut off the light passing to the surface on which projection is effected.

In fact, it is found that the maximum degree of opacity should be such as to cut off, comparatively speaking, a small proportion of the light.

At the present time it is difficult to express in precise language the maximum degree of opacity which is desirable. It may be stated, however, that the portion of the screen adapted to absorb the maximum amount of light should be still sufficiently transparent to enable a relatively clear image to be projected through it by the particular source of light which is used in the projection.

Expressed otherwise, the screen at the portion referred to should be sufficiently transparent to permit a person in normal daylight to see objects through it distinctly or relatively so.

From the above description it will be gathered that in projection in accordance with the invention the views are not in all cases projected in alternation. They may be projected simultaneously and there is, as it were, a pulsation in their lighting or in their sharpness of definition.

The fading or transition may be effected in other ways; for instance, an arragement of mirrors could be used for securing the desired variation in the amount of light passing through the right- and left-hand members of a pair of stereoscopically related views.

The desired result may also be obtained by appropriate motion of the lenses employed in projection; for instance, by altering the focus of the lenses, by the employment of an arrangement of mirrors, by varying the intensity of the light emitted from the source of illumination in any convenient manner, by varying the distance between the lenses and the diapositives of which the images are projected or by any other means which can be conveniently employed to secure a partial fading or diffusion of the view corresponding with that seen by the right-hand eye and the projection with increasing distinctness of the view corresponding with that seen by the left-hand eye.

Alternatively, in taking the picture, that is making the negative from which the positive used in projection is produced, or in making the positive, means may be adopted to secure the dissolving or gradual transition of the view which would be seen by the observer with the one eye into the view which would be seen by him with the other eye or the gradual diminution of intensity of illumination, brilliance or sharpness of definition of the view as seen by the one eye and corresponding increase in intensity of illumination, brilliance or sharpness of definition of the other view. For example, in taking the negative a number of views taken in succession by the lens adapted to furnish a representation of the view as seen by one eye may be of gradually diminishing exposure while corresponding views as seen by the other eye are of increasing exposure, such a result being secured by, for instance, stopping down the one lens and increasing the working aperture of the other, the variation in the apertures of the lenses being secured by any convenient means, preferably associated with the usual devices whereby successive exposures are made and the negative film moved.

Alternatively, graduated shutters, for instance shutters having areas of varying degrees of light transmitting power or apertures of varying sizes, may be associated with the lenses in order to secure the desired variation in exposure.

Another possible alternative involves varying the focus of each lens or the distance between the film or films and the optical systems of the camera so as to secure the progressive diffusion in focus of successive representations of the view as seen by one eye and the progressive increase in sharpness of definition in successive representations of the view as seen by the other eye.

In any of these alternatives when pairs of stereoscopically related views are taken they may be taken on the same film or on separate films and in the former case side by side or in alternation one below the other, when of course some means of known character must be provided in the camera to secure that the left-hand and right-hand views are brought into the desired position on the film.

A further possibility is the use of two films, the "speed" of the emulsion of which varies from section to section of the length of the film.

Instead of producing images of the right- and left-hand views side by side or one following the other on the film, composite images may be produced thereon by the employment of means adapted progressively to diminish the illumination of successive images of the right-hand and increase the illumination of the successive images of the left-hand view.

The means which may be employed in order to secure a positive in which successive views such as would be seen by one eye of an observer are prints of gradually diminishing depth while the corresponding views as seen by the other eye are of gradually increasing depth from a negative not exhibiting corresponding characteristics will be apparent; the time of printing such successive views or the intensity of light employed in printing will, for instance, enable this result to be secured.

Alternatively, the desired result may be obtained by securing a diffusion of the image of one view and a corresponding increase in sharpness of the image of the other view. This may be done, for instance, by varying the focus of the lenses in taking the picture. The desired result can also be secured in printing the diapositive from a negative taken in the usual way by causing in successive pairs of views a decrease in intensity or a decrease in sharpness of the images of one member of successive pairs of views and an increase in intensity or sharpness of the images of the other member of each pair of successive views.

Preferably in no case would one of the views be completely cut out. Thus, properly speaking, there would be no alternation as during the whole period of projection both the view seen by the right eye and the view seen by the left eye would be simultaneously projected on to the screen.

From the description relative to the use of shutters or screens of graduated opacity it will be gathered that in this case also the degree to which the illumination of one of the views is reduced relative to the illumination of the other will be somewhat critical and at the present stage it is not possible for me to furnish precise indications of the maximum and minimum illumination or sharpness of one view relative to the minimum and maximum illumination or sharpness of the other.

A further feature of the invention comprises the projection of three or more representations of each view, one of the views being that seen by the left eye, the other the view seen by the right eye and the other or other views such as would be seen by an eye located in a position between the right- and left-hand eye. With this arrangement the projection of the left- and right-hand views may be effected in any of the manners above described while the intermediate view is projected with a constant intensity or with a constant sharpness of definition.

Alternatively, the illumination of the intermediate view may be varied.

It will be understood that when screens of graduated opacity are employed a screen may be arranged to operate in conjunction with each member of a pair, triplet or other multiple of views or a single screen may be employed to operate in conjunction with both or all of the members of a pair, triplet or other multiple as the case may be, the screen in such case being divided into a plurality of bands of graduated opacity adapted to operate in conjunction with each of the several views.

Thus, for instance, the copying machine may be provided with shutters or screens whereby the exposure of successive sections of the positive films may be varied, such shutters or screens being of suitably graduated light transmitting character or being opaque members provided with a plurality of holes varying in size in order to secure a greater or less intensity of illumination of the positive film.

To this end the shutters will be associated with the feed mechanism of the film or films so that the latter and the shutters will be moved in step while the shutters may be located between the source of light and the negative film.

Alternatively, a diaphragm or diaphragms adapted to open and close at a certain speed can be used for varying the exposure of the successive sections of the film.

When the transition of the individual members of the pairs of stereoscopically related views into the other members is effected for the purpose of cinematograph projection the invention extends to the employment of a single film, each of the successive images of which is the composite image of a pair of stereoscopically related views, the successive composite views comprising one of the two images of the stereoscopically related views of greater or less intensity or greater or less sharpness of definition than preceding or succeeding views.

Thus, in accordance with this example of a manner of carrying the invention into effect a single film adapted to be employed in a projector of the usual construction, the successive images on the said film being each a composite of the right- and left-hand members of the sterioscopically related views, is formed from two films comprising stereoscopically related views or from a single film on which two stereoscopically related views are produced as negatives or positives, the intensity or sharpness of definition of the said views being related in the manner described above, that is to say the successive images of the view seen by the right eye are of increased or reduced intensity or sharpness of definition while the successive images of the view seen by the other eye are of reduced or increased intensity or sharpness of definition and obtained as, for example, described in certain of the preceding paragraphs.

Various optical means may be employed for securing this result; thus, for instance, means whereby light may be projected through a negative film or negative films, representing the views as seen by the right and left eyes of an observer, on to a film which will form a positive so as to produce thereon in succession a number of corresponding composite images, may be adopted.

Apparatus for use in carrying the invention into effect in the manner above indicated may comprise a source of light, two projectors, means for moving the negative films of the stereoscopically related views in step through the gate or gates associated with the projectors, means for obtaining the pulsation, an optical system adapted to cause the two images to be superimposed in appropriate relationship upon a film adapted to form a positive which is moved in a step wise manner in accordance with the motion of the two negative films and means adapted to vary the intensity of illumination or the sharpness of focus of one or more of the projected images in the manner above indicated or, in other words, secure the pulsation effect.

Alternatively, two positive films, each comprising stereoscopically related views, could be run through the apparatus, in which case a negative film (each view on which was a composite of the stereoscopically related views) would be obtained.

This alternative method of operation perhaps presents certain advantages as, having produced a composite negative, the same can be dealt with by a trade printer and any desired number of corresponding positives produced therefrom.

Detailed description of various optical devices for securing the superimposition of the two images is apparently unnecessary.

A system of prisms could, for instance, be employed, the two images being caused to converge by the prisms and a common lens being provided for focussing the composite image upon the film.

Alternatively two projectors with their projecting lenses of appropriate focus may be arranged so as to project a composite image on to a film adapted to produce a positive or negative.

In the above description reference has been made to pairs of stereoscopically related views; in some cases a triplet or a higher multiple of views may be used.

Where a triplet is employed the three views will be projected and a composite of the three images formed, and so also when a multiplicity of views greater than three are employed a corresponding composite of all the views will be formed.

The gradual transition of the projected image of the one pair of stereoscopically related views into the image of the other member may, in accordance with the invention, alternatively be effected by the employment of means adapted to reduce the area of the projected image of one of the stereoscopically related views while simultaneously increasing the area of the projected image of the other of the pair of views.

Such means may comprise a shutter device adapted to obscure a progressively increasing portion of one member of a pair of stereoscopically related views while simultaneously permitting the illumination of an increasing proportion of the portion of the film containing the other member of the pair.

The shutter may be so arranged as to secure the projection of one or other member of each pair of stereoscopically related views, one or more times before the next pair of stereoscopically related views is brought into position for projection.

The shutter may operate to obscure one member of a pair gradually from the right-hand to the left-hand side thereof or vice versa simultaneously permitting an increasing proportion of the other view from the right- to the left-hand side thereof to be projected, or it may be formed to obscure a plurality of bands or sections of the image, the width of such bands progressively increasing, while a plurality of bands of the other member of the pair of images of progressively increasing width are permitted to be illuminated.

The desired result may be achieved by the employment of a rotating shutter provided with suitably formed slots or by a shutter device formed mainly of transparent material and having in one of its surfaces or in its substance an opaquing medium so distributed as to secure a similar result.

The shutter, to this end, may be circular and formed of a normally transparent material, for instance glass, with arcuate opaque bands of a width sufficient to completely obscure one view, disposed eccentrically on the shutter to enable a gradually increasing area of one member of the pair of stereoscopically related views to be obscured and an increasing area of the other to be exposed as the screen is rotated.

Alternatively, opaque bands of any other suitable form may be provided on the shutter, for instance arcuate bands in the form of curved wedges so arranged that a progressive obscuration of the one member as a whole or in sections and a corresponding exposure of the other member is secured.

If desired, the speed of the shutter in this case, as also when a shutter of graduated opacity or light-absorbing quality is used, may be such that successive pairs of views are exposed once only or several times before the next pair of views is brought into position in the gate for projection.

The rotation of the shutter above described may be secured in accordance with the invention by any suitable motion transmitting means forming part of the projection apparatus; for instance, from the feed sprocket engaging the film by providing on the side thereof a bevel wheel meshing with a second bevel wheel secured on a vertical spindle on which is a further bevel wheel engaging a similar wheel on the rotating shutter adapted to secure the exposure and obscuration of the members of the pairs of views in the manner indicated.

A further feature of the invention is based upon the observation that by the method of securing stereoscopic effects involving transition of one member of a pair of stereoscopically related views into the other member in cinematography, the desired result may be secured by exposing a film or films (to obtain simultaneously right- and left-hand images) within the usual limits of speed of travel of the film through the camera and causing the resultant positive film or films to travel within the usual range of speed through the projector and securing the diminution of intensity or sharpness of definition of the right-hand views and the increase in intensity or sharpness of definition of the left-hand views and vice versa during the passage of a relatively considerable number of sections of the film or films.

Thus, from the moment when the image of the right-hand view is projected with the maximum intensity until the moment when the image of the left-hand view is similarly projected, eighteen successive sections of the films or eighteen successive sections of each of the films may, for example, be caused to travel through the gate or gates of the projector or projectors.

Similarly, in "taking" the film the diminution of intensity or degree of sharpness of, for instance, the right-hand image from its maximum to minimum value and the corresponding increase in intensity or sharpness of the left-hand image may extend over a number of views taken at the usual speed.

When right- and left-hand views or similarly differentiated views are formed on the film in alternation or sequence in actually taking the film or in printing or for projection and viewing it may be necessary to increase the speed of travel of the same through the gate.

In some cases it may be found desirable to permit one of the images to function as a stabilizing image, that is to say one image may be projected with a constant intensity or degree of sharpness while the other image or images is or are alternately projected with increasing and decreasing intensity or sharpness.

This result can, of course, be secured in the "taking", in the printing or projection of the film.

It is of considerable advantage that the result desired can be secured without the necessity for moving the films in taking and projecting at a speed above the normal speed of travel for, as will be understood, if it were necessary to move the film at a considerably higher speed mechanical difficulties would arise in the construction of the taking and projecting apparatus and in addition the risk of breaking the film would be considerably increased.

According to another phase of the invention the screen on which the images of the stereoscopically related views are projected is divided into a large number of areas, the light absorbing properties of which differ in such manner that certain of the areas absorb the greater portion or reflect or transmit only a portion of the light passing to the screen through one or both of the stereoscopically related views on the film.

Thus the screen may be divided into stripes or bands or be chequered or spotted, or provided with a network of lines of one colour with small areas of another colour between the lines forming the network.

The division of the screen in the manner indicated is normally substantially regular.

Further, during the projection on to a screen of the character indicated, motion may be imparted to the screen.

The screen may be divided into areas, certain of which are black while others are white, or into areas of two complementary colours.

When a screen is divided into areas, certain of which are black while the others are white, the screen may be moved in a stepwise manner, as by oscillating it or by employing an endless member as the screen and moving it in one direction over rollers through a distance equal to the dimension of one of the small areas into which the screen is divided measured in the direction of the travel of the screen.

When a black and white chequered screen is used and motion is imparted to it in the manner indicated, if a shutter adapted to obscure alternately the left- and right-hand views is employed and is moved in step with the screen the images of the left- and the right-hand views will be seen alternately on different portions of the screen.

When the screen on which the stereoscopically related images are projected is divided into two sets of areas, one set being in, say, red and the other a complementary colour, and the light employed in projection of the stereoscopically related representations on the film is correspondingly coloured, the green light by which one image would be formed will be neutralized by the red areas and the observer will secure an impression of "black" in consequence and the equivalent result will be obtained by red light falling upon the green coloured areas.

In this way a plurality of areas of each of the two stereoscopically related views will simultaneously be visible to the observer and, if motion is imparted to the screen as described in connection with a screen divided into black and white areas, where areas of one view would appear, corresponding areas of the other view will become visible.

When the screen is divided up in the manner indicated into areas having different light absorbing properties, the screen may be wholly or in part transparent according to whether the areas are of complementary colours or are black and white.

Normally the differently coloured areas of the screen will be symmetrically disposed.

As will be observed, both in this way as well as by certain of the other means described herein, portions of both of the stereoscopically related views will be projected on to the screen simultaneously and as it were a "mixture" of the two views will be secured.

In conclusion it is pointed out that the above description is furnished for the purpose of explaining the nature of the invention and that numerous changes and variations in the details of construction and operation above set forth may be made without exceeding its scope.

In particular it may be pointed out that the desired result may be secured in accordance with the present invention (1) by "dissolving" (blending) of the stereoscopic pictures one into the other or the pulsation in their brilliance or sharpness of definition; (2) by alternatively projecting stereoscopic pictures in such a way and by such means that the right-hand pictures should appear on certain relatively close spots on the screen and the left-hand picture should appear on other relatively closely disposed spots of the same screen, both sets of spots being conveniently arranged and intermixed, the condition sine qua non being that on the particular spots on which the right-hand pictures are projected the left-hand picture should not be registered at any time and vice versa.

The invention will be described further and in greater detail with reference to the accompanying drawings, in which:—

Figure 1 illustrates diagrammatically one form of rotating screen in accordance with the invention;

Figure 2 illustrates a section of film with which the screen is adapted to operate;

Figure 3 illustrates in front elevation a somewhat modified form of screen and the films and film and screen operating mechanism;

Figure 14:
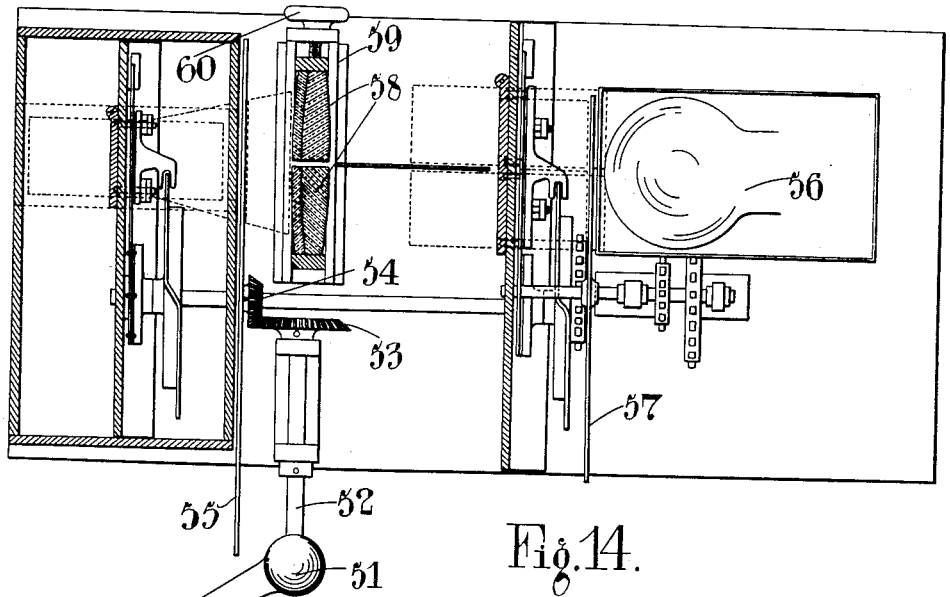

Figure 4 being a side elevation of the same;

Figure 5 illustrates a form of screen also adapted to function as an obturator;

Figure 6 is a diagrammatic view of another form of screen adapted to be employed with two independent films spaced a relatively considerable distance apart;

Figure 7 represents a section of film with right-hand and left-hand views printed in succession thereon and a screen adapted for use therewith, and Figure 8 is a view illustrating the arrangement of the projector lenses to secure the projection simultaneously of right- and left-hand views printed in the order indicated in Figure 7;

Figure 9 is a view illustrating an alternative mode projection with the employment of a film on which right- and left-hand views are printed alternately in succession and a screen as illustrated in Figure 7 is employed;

Figure 10 is a diagram illustrating means for producing right- and left-hand views in alternation on a film in taking;

Figure 11 is a diagram illustrating one means of securing superposition of the right- and left-hand views and the variation in intensity or brilliance of the successive views when producing a film the individual sections of which are composite images of the right- and left-hand views;

Figure 12 is an optical diagram illustrating a further mode of producing a positive or negative comprising the composite images of the right- and left-hand views, and Figure 13 is an elevation partly in section;

Figure 14 is a plan, and

Figure 15:
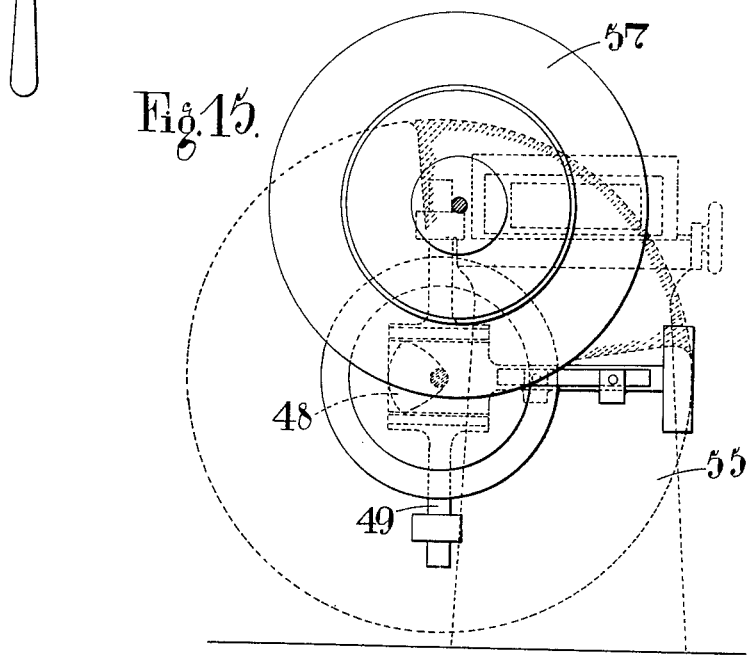
Figure 16:
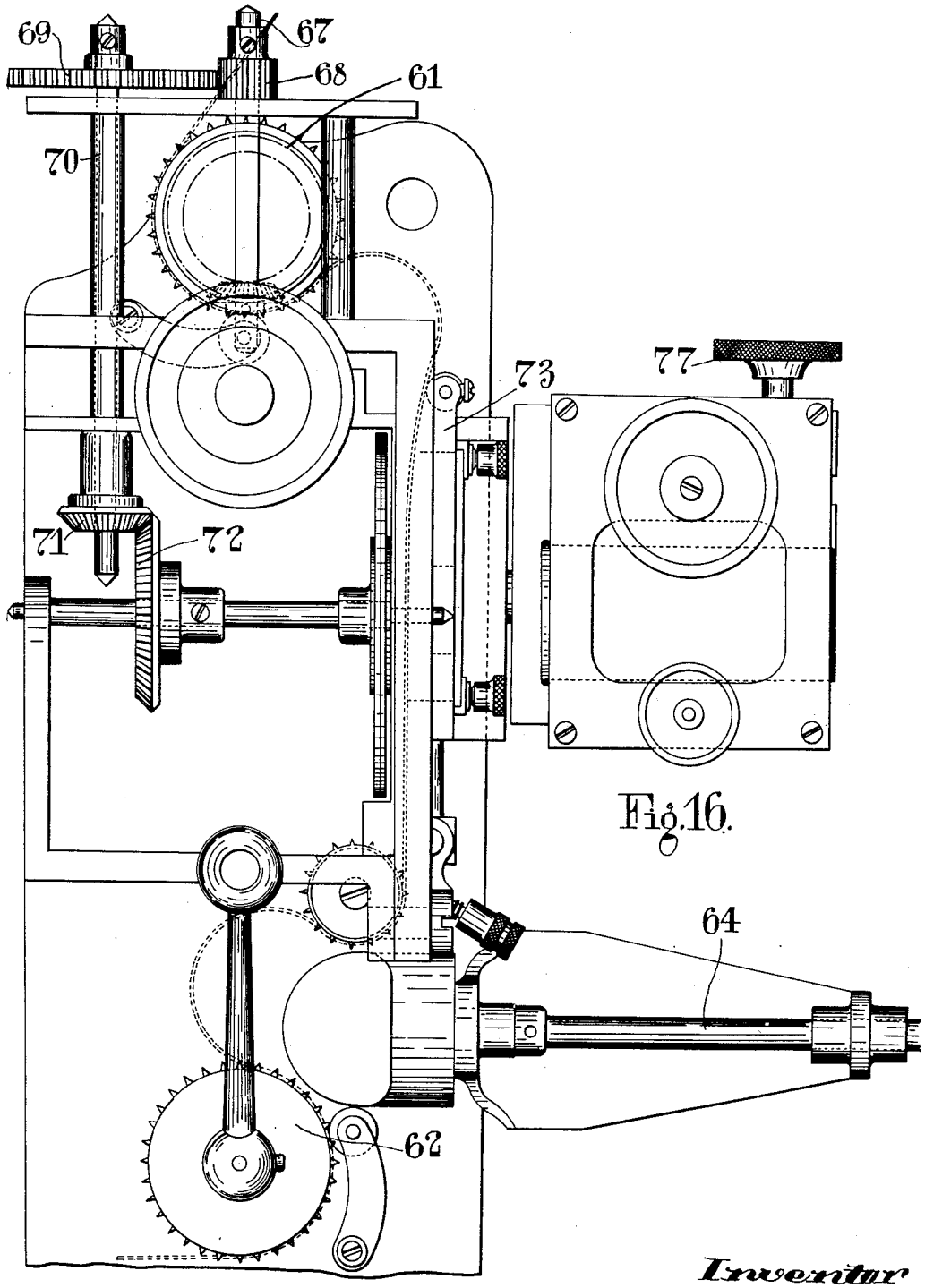
Figure 17:
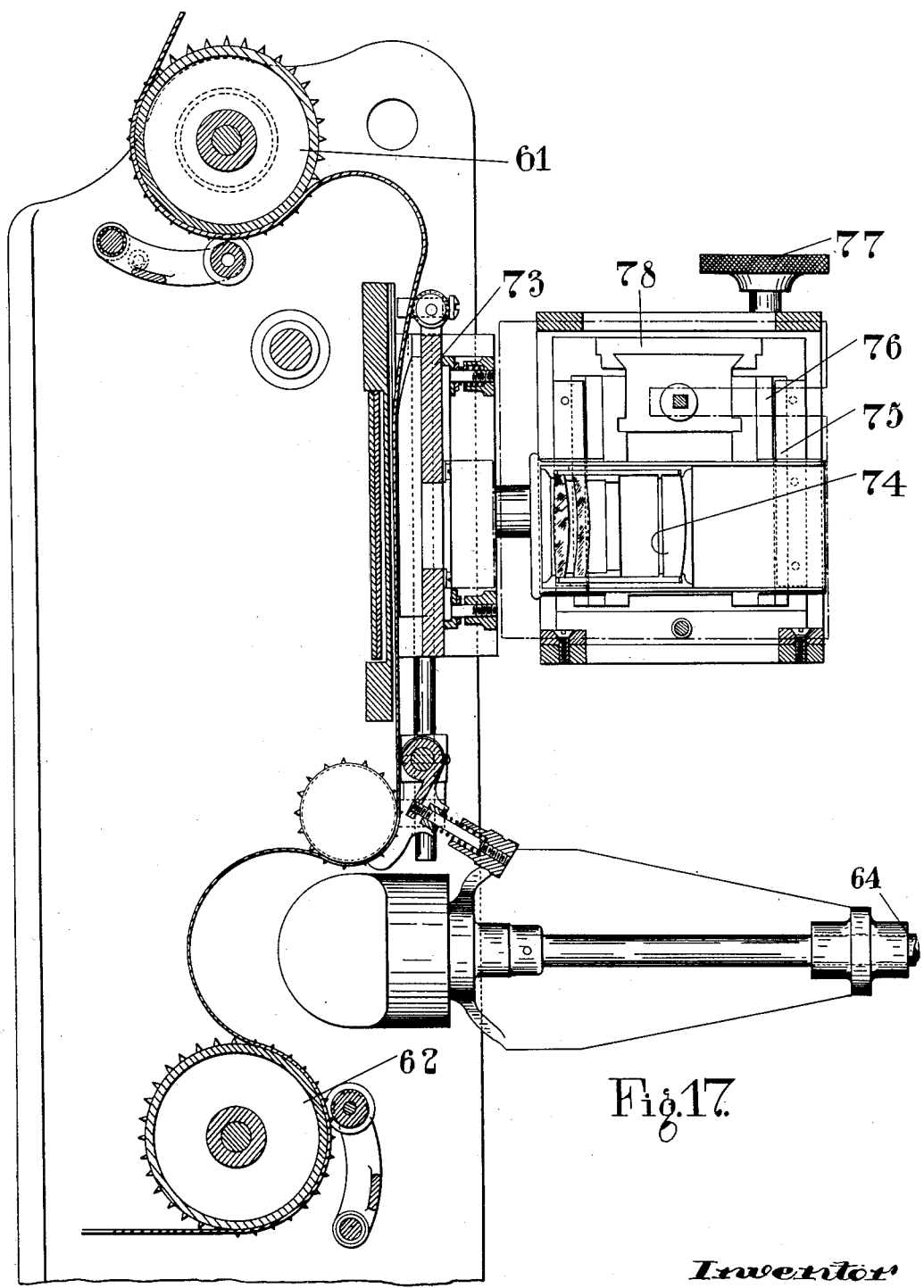

Figure 15 a diagrammatic view of a printing or copying device embodying the optical system illustrated diagrammatically in Figure 12;

Figure 16 is a side elevation of a projector employing a screen as illustrated in Figure 1 and a film as illustrated in Figure 2;

Figure 17 a section, and

Figure 18:
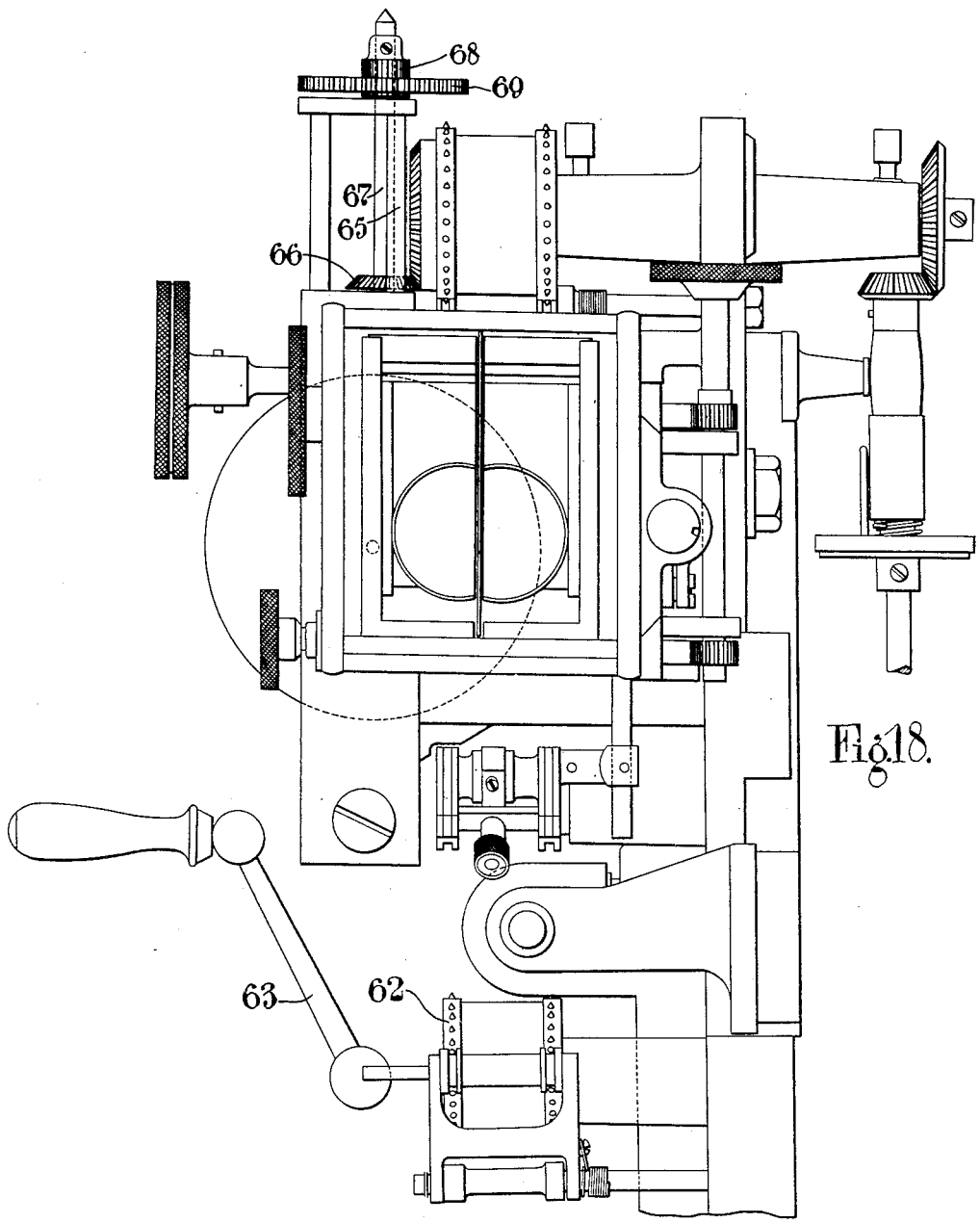
Figure 19:
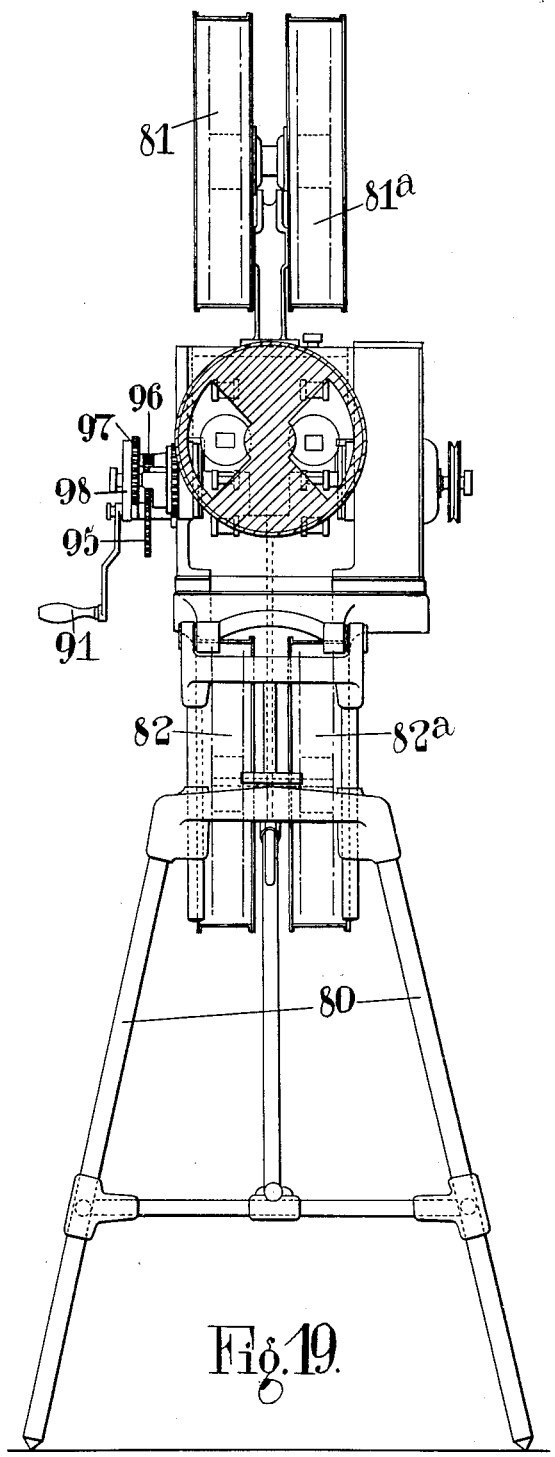
Figure 20:
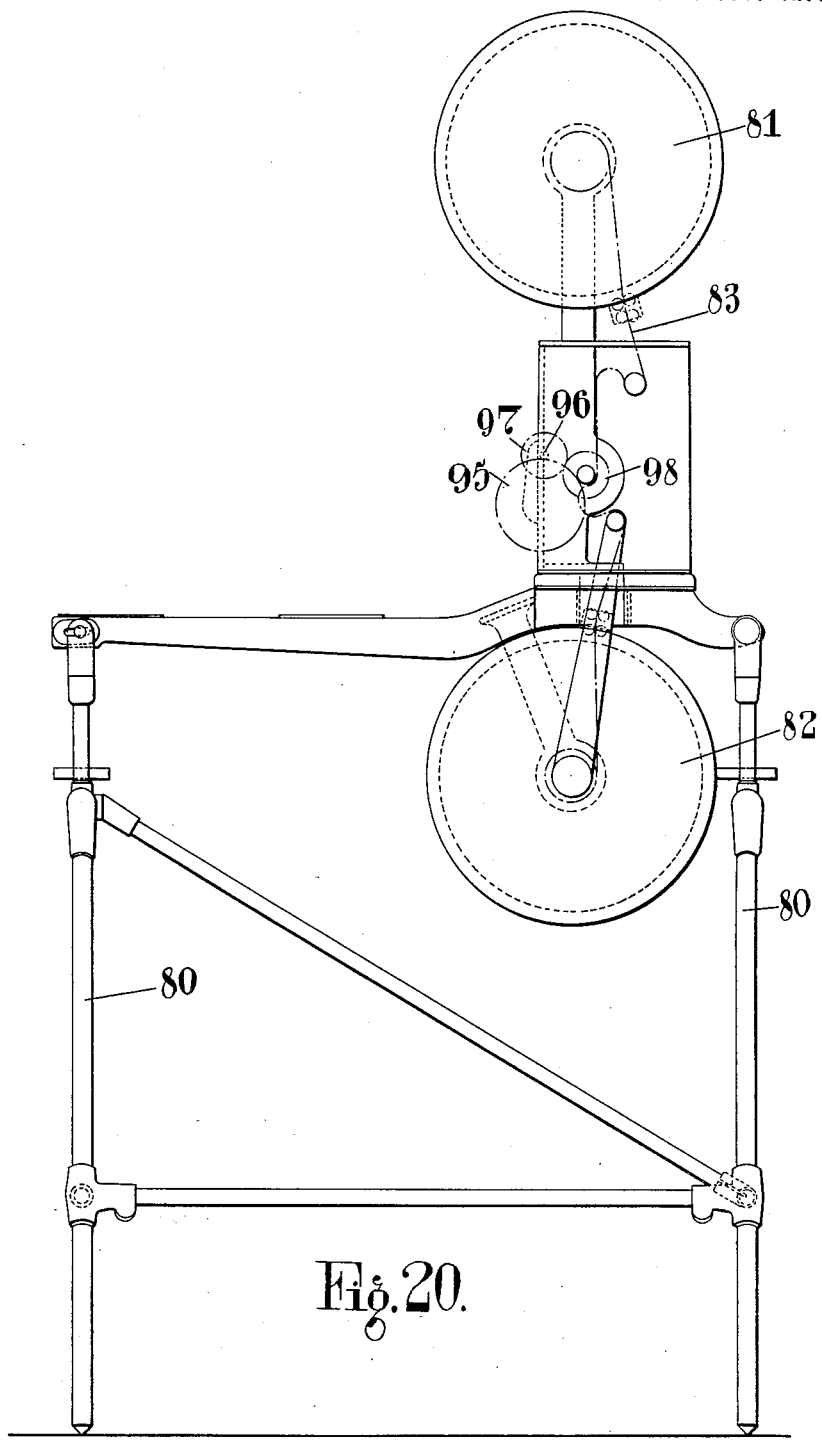

Figure 18 a front elevation thereof.
Figure 19 is a front elevation;
Figure 20 is a side elevation of an apparatus employing a screen adapted to be used with two independent films as illustrated in Figure 6.

Figure 21:
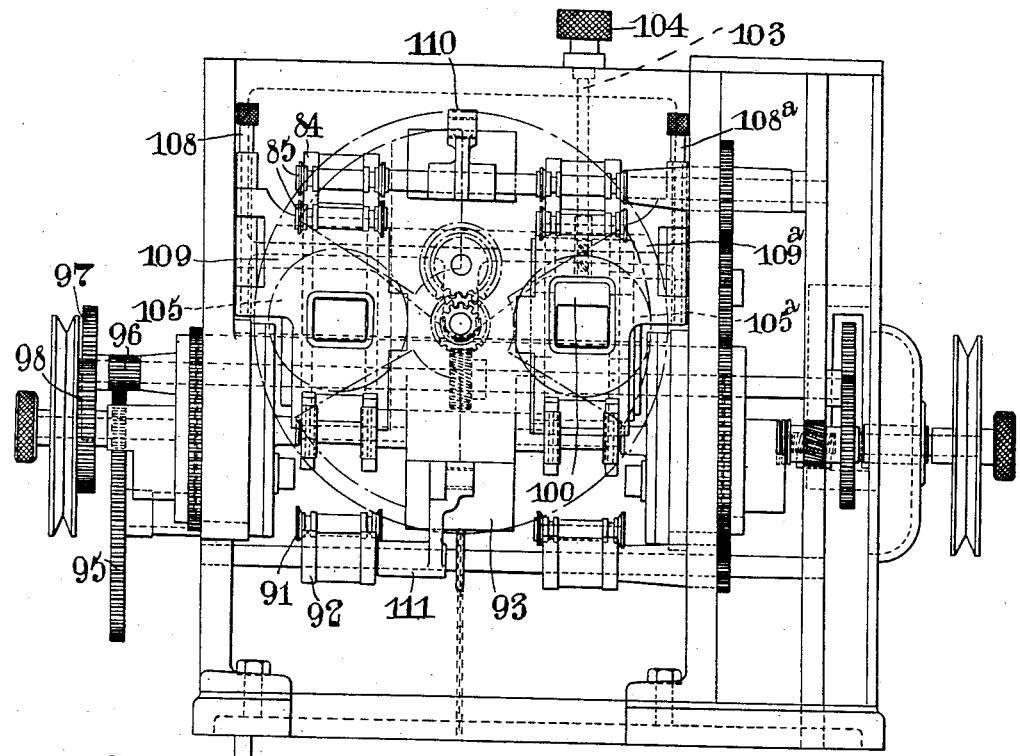
Figure 23:
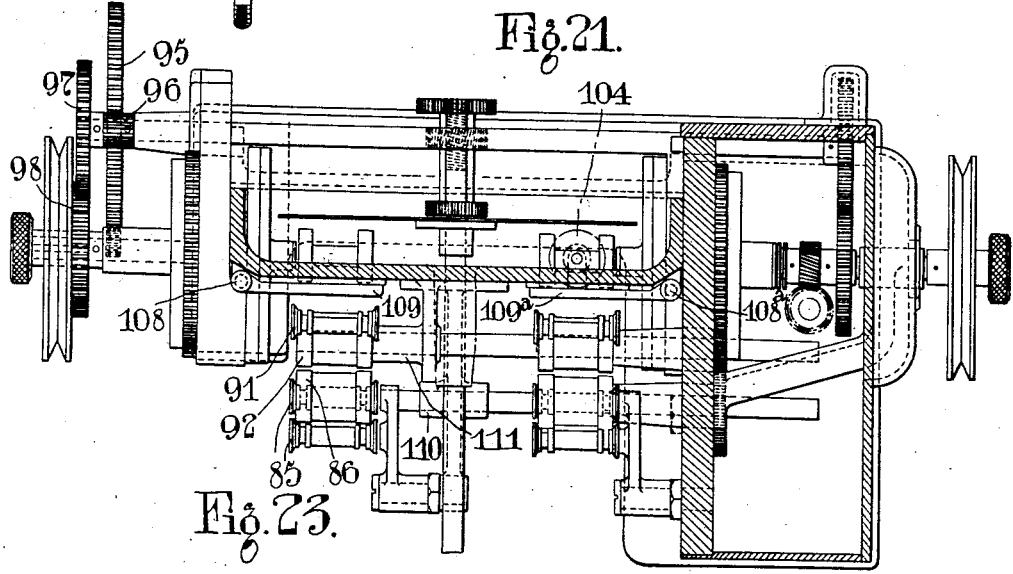
Figure 22:
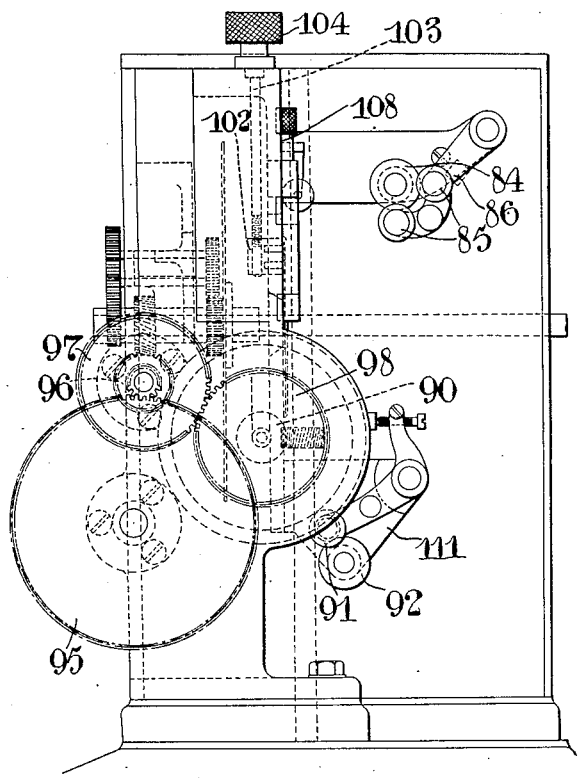
Figure 24:
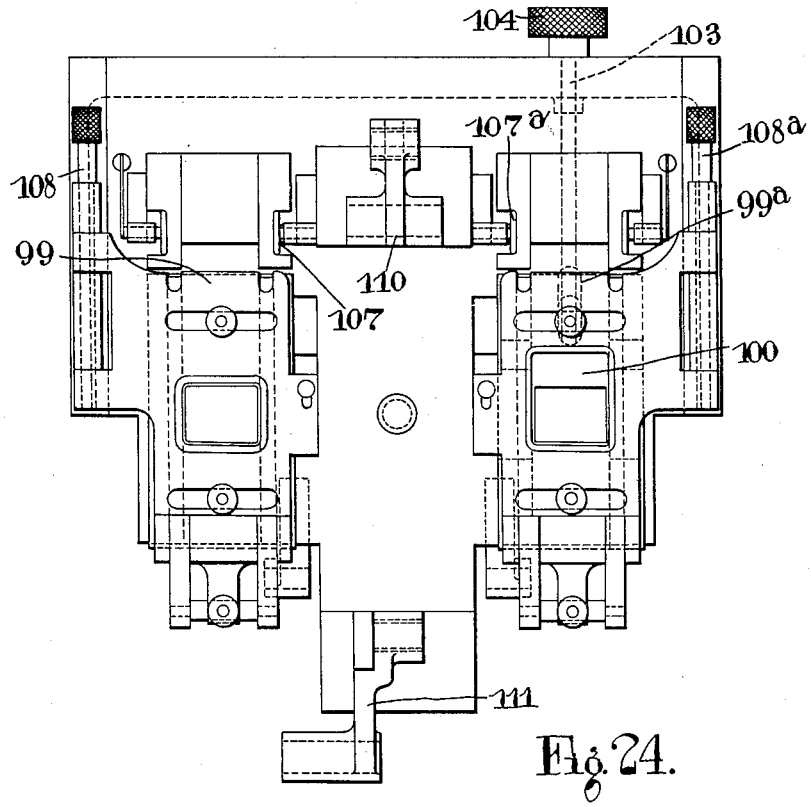
Figure 26:
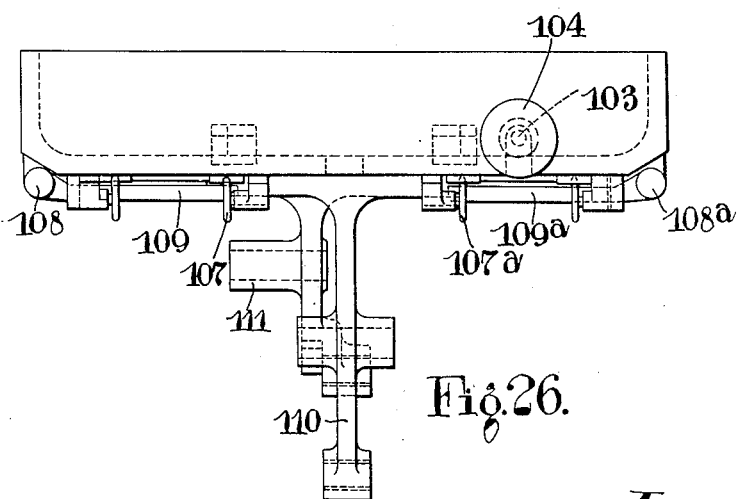
Figure 25:
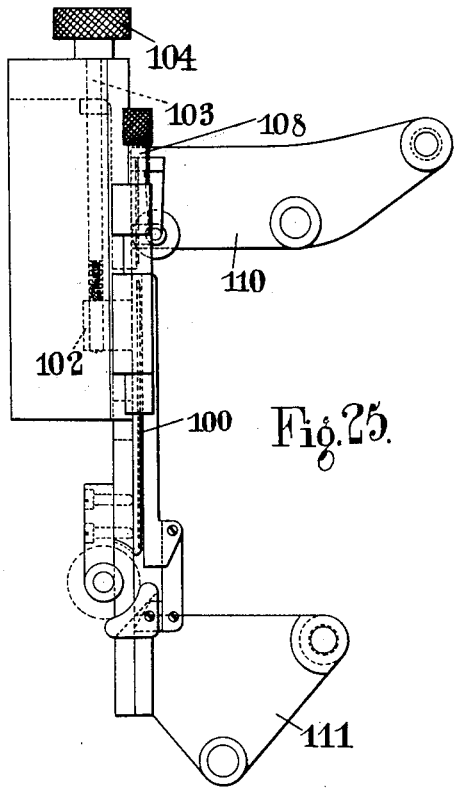
Figures 27, 28:
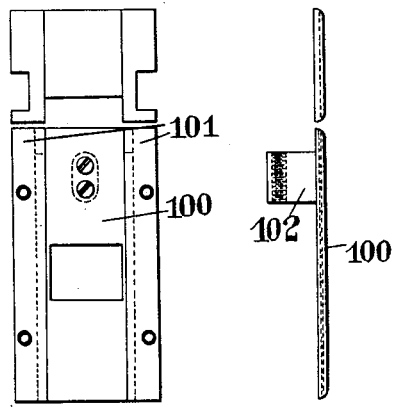
Figure 29:
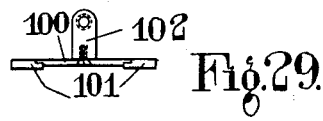

Figures 21, 22 and 23 are a front elevation, side elevation and plan view respectively of the projector portion of the apparatus illustrated in Figures 19 and 20, drawn to a larger scale, and Figure 24 to 29 are details of the gates and gate-adjusting mechanism.

Figure 30:
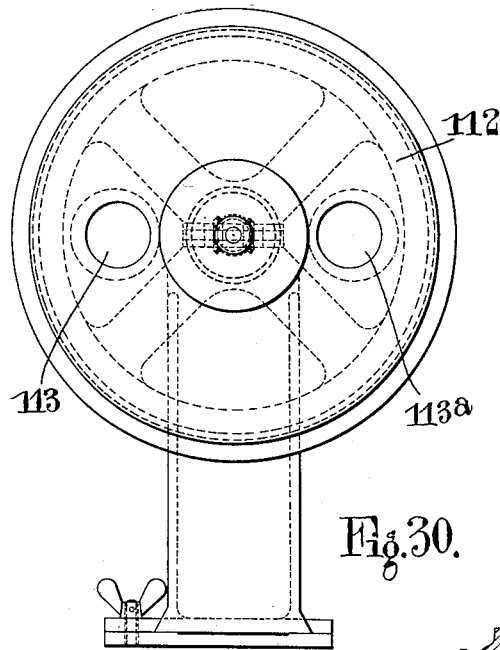

Figure 30 is a front elevation and

Figure 31:
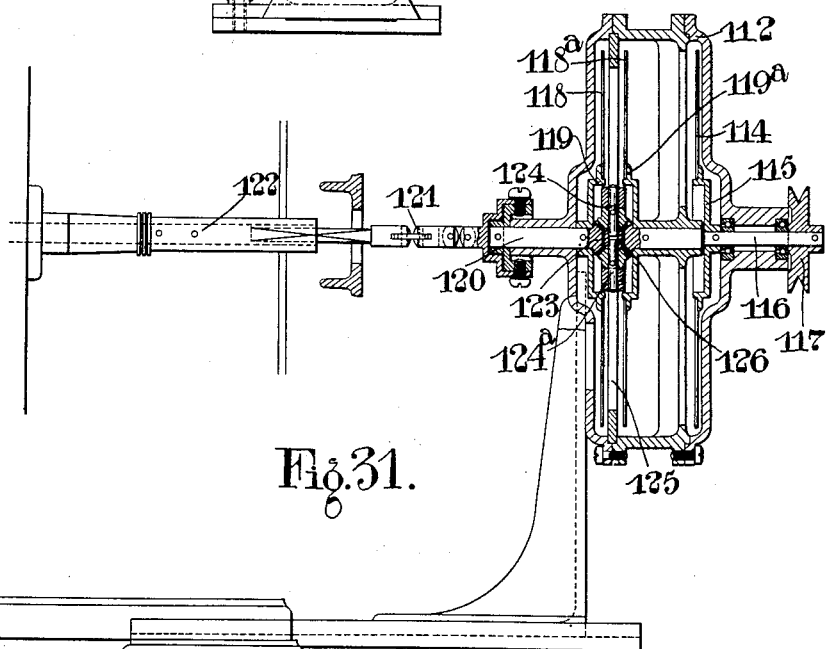

Figure 31 a section of a modified form of combined screen and obturator mechanism also on a larger scale.

In the drawings, 1 is the screen, 2 the shaft on which it is mounted. Conveniently, the screen is mainly of glass and it may be formed by fogging the light sensitive coating of a photographic plate so as to form thereon a silver deposit the opacity or light-absorbing capacity of which is graduated in the necessary way. This deposit is, however, very faint even at those sections of the screen which are of the maximum degree of opacity. To the fogged plate, after developing, fixing, washing and drying, a cover glass is cemented on the film side of the plate and the screen thus produced is cut to the desired dimensions.

In the construction illustrated in Figure 1, the screen comprises two concentric bands 3 and 4 the lightest portion 5 of the inner band being adjacent to the darkest portion 6 of the outer band. A screen of this character is adapted to operate with a film as illustrated in Figure 2 in which right- and left-hand views 8 and 8ª are printed side by side on the band of film 9, the position of the views relative to the two bands on the screen being indicated in dotted line in Figure 1.

Referring to Figures 3 and 4, the screen (as will be seen) is similar to that illustrated in Figure 1; its dimensions, however, are such as will permit of its employment with two films 10 and 10ª containing respectively the right- and left-hand views. These films are taken up by film sprockets 11 and 11ª on the shaft 12 on which is also mounted the Maltese cross 13 engaging the pin wheel 14 of the operating mechanism and on the shaft in question a sprocket 15 driving through the chain 16 the sprocket 17 is also secured. This last-mentioned sprocket and the bevel pinion 18 are mounted on a spindle 19, the bevel pinion meshing with the bevel wheel 20 mounted on the spindle 21 on which the screen is secured, the driving connection described operating to ensure the rotation of the screen at a speed corresponding with the speed of travel of the films. In the construction illustrated in Figure 5 the screen is provided with a section 22 adapted to perform the function of the obturator usually provided, that is to say to interrupt the passage of light during the time the film is moving in the gate of the projector.

The screen illustrated in Figure 6, as will be observed, comprises only one band 23 the gradation of which varies. In this case two films 24 and 24ª are employed, one on each side of the vertical axis of the screen.

When the films on which the right- and left-hand views are produced are spaced apart, as shown in this figure, prisms or mirrors will be needed to secure the registration on the exhibiting screen of the right- and left-hand views.

In the construction illustrated in Figure 7 the screen comprises two sets of sections differing in tone as follows:—$a, b, c, d, e, f, g, h,$ increase in opacity progressively from $a$ to $e$ and then decrease to $h$; $a', b', c', d', e', f', g', h'$ similarly increase in opacity from $a'$ to $e'$ and then decrease in opacity to $h'$. When, therefore, the screen is rotated in a counter-clockwise direction the lightest section $a$, which may be taken as being in register with the projector lens when the screen is arranged relatively thereto, as illustrated in Figure 9, will be followed by $f'$, the darkest of the second set of sections. The film comprises right- and left-hand views printed alternately, as indicated by the references 25 and 25ª; consequently, if the screen and film are moved in step the right-hand views will be illuminated on the projection screen with decreasing intensity while the left-hand views will be illuminated with increasing intensity until the respectve minimum and maximum are reached, when the illumination of the left- and right-hand views will vary in the reverse sense.

When, on the other hand, the film and screen are associated with a projector, such as that indicated in Figure 8, right- and left-hand views will be simultaneously projected, the aperture 26 in the gate 27 being of an area equal to two sections of the film and the lens system 28 being arranged to project these two views in their appropriate relationship on the exhibiting screen.

Referring to Figure 10 in which the arrangement which may be employed to secure a negative film on which the right- and left-hand views occur in alternation and in which the successive representations vary in exposure or density is illustrated, 29 and 29ª are two lenses, 30 and 30ª prisms associated therewith and 31 a lens adapted to focus the light upon the taking film 32, a rotating screen 33 of the character indicated in Figure 7 being employed for varying the exposure of the film. With this arrangement a further shutter is provided for obstructing the passage of light through the right- or left-hand lens to the film when taking the left- or right-hand view.

Referring to Figure 11, which is a diagram illustrating a printing device adapted for use in producing from two films (positives or negatives) representing right- and left-hand views, a single film (a negative or positive) in which the successive views or sections are constituted by left- and right-hand views in superposition, in this figure 34 and 34ª represent the films to be copied, 35 and 35ª prisms adapted to bring the views into register, 36 a lens and 37 the film on which the copy is produced.

In Figure 12, which is an optical diagram illustrating the principle of operation of the apparatus shown in Figures 13, 14 and 15, 38 and 38ª represent the two films containing respectively left- and right-hand views, 39 and 39ª the lenses projecting the light passing through these two films on to a third film on which the copy is produced. The films to be copied are drawn from spools, one of which, 40, is seen in Figure 13. The film on which the copy is to be produced is drawn from the spool 41 arranged in the casing 42 attached to the camera body 43, the film passing into the latter through the slots 44, 44ª and from the camera body by way of the slots 45, 45ª. This film is fed in a stepwise manner by means of a known reciprocating feed device 46 operated by the shaft 47 on which is also a cam 48 operating a similar feed device 49 acting upon the films to be copied and feeding them through the gate 50 at a corresponding rate by the rotation of the crank handle 51 keyed to the spindle 52 to which a bevel wheel 53 meshing with the pinion 54 is secured. On the shaft operating the feed mechanisms an obturator 55 is mounted for preventing light passing from the lamp 56 to the camera when the films are in motion and by suitable gearing from the shaft motion is imparted to the screen 57 which is of the character indicated in Figure 3. The lenses 58 are secured in a common mount and are arranged on a guide 59 in which they are adapted to be traversed by the adjusting screw 60 for the purpose of securing the appropriate location of the composite image on the copying film.

Referring to Figures 14 to 16 in which, as above stated, the essential portions of a projector provided with a rotating screen as illustrated in Figure 1 and a film on which right- and left-hand views are printed side by side, as illustrated in Figure 2, are employed, 61 is the upper film draw-off sprocket and 62 the take-up sprocket; 63 is the handle operating the latter and also the feed mechanism and the shaft 64 on which the obturator is mounted. The upper film draw-off sprocket is provided on one face with a bevel wheel 65 engaging a bevel pinion 66 secured to the spindle 67 on which the spur pinion 68 is mounted. This pinion is in engagement with the spur wheel 69 mounted on the spindle 70 on which is mounted also the bevel pinion 71 meshing with the bevel wheel 72 secured to the spindle carrying the rotating screen. The screen is rotated at such a speed that it makes one revolution during the passage of thirty-six sections of the film through the gate 73 and the regulated amount of light passing through the film is focused by the projector comprising two optical systems 74 and 74ª in a mount 75 secured in guides 76 adapted to permit the mount to be traversed in a vertical plane by means of a feed screw 77. This guiding member is engaged in guides 78 and is adapted to be moved in a horizontal plane by means of the lead screw 79, in order to bring the projector into the appropriate relationship with the section of the film registering with the aperture in the gate.

The optical portion of the projector lens, as will be observed, is in effect formed from the optical elements of two projectors of the usual character, the individual lenses of which have been ground down so that their optical axes may be brought sufficiently close together.

With this form of projector the illumination of the left-hand images on the film will be progressively diminished from a maximum to a given minimum as successive images are brought into register with the projector lens while the light passing through the right-hand images will be correspondingly increased to a maximum, this diminution and increase taking place during the travel of eighteen sections of film through the gate, after which the illumination of the left- and right-hand views will be respectively increased and decreased. Thus, for one complete cycle thirty-six sections of film will travel through the gate.

Referring to Figures 19 to 31 which, as above stated, illustrate apparatus comprising two projectors and employing two independent films in the manner illustrated diagrammatically in Figure 6, 80 is the stand on which a double projector is mounted. The films on which stereoscipically related views are printed are drawn from two spools 81, 81ª through the projector mechanism and are rewound on the spools 82, 82ª; 83ª in Figure 20 indicating one of the films. The mechanism for guiding and feeding each of the films is of the general character of similar elements of the known projectors. Each such mechanism comprises a roller 84 with which a plurality of rollers (see Figure 2) mounted in a carrier 86 guide the film as it is withdrawn from the spool, the film then passing over the roller 86 through the gate 87, being drawn forward by the sprocket 90 and between the two rollers 91 and 92 and thence on to the rewinding drum. The feed of the film and the operation of the obturator 93 are secured through the intermediary of the handle 94 and train of wheels 95, 96, 97 and 98.

For enabling the two views to be projected in appropriate relationship on the screen the aperture of the latter of the two gates 99, 99ª is greater than the normal size and with this gate is associated, as illustrated in greater detail in Figures 24 to 29, a mask 100 slidably mounted in guides 101 and provided with a boss 102 in which the screwed end of the spindle 103 provided with a knurled head 104 is engaged so that by appropriate rotation of the spindle the mask may be raised or lowered.

Two projector lenses 105 and 105ª are appropriately located relatively to the gates and a screen 106 of the character indicated in Figure 6 is located behind the projector lenses and is arranged to be driven at a suitable speed for securing a stereoscopic effect by variation in illumination of the right- and left-hand views in the manner specified above.

The portion of the projector carrying the gates, which comprise as usual hinged portions 107 and 107ª, is mounted on pivots 108, 108ª, and with the gates anti-friction rollers 109, 109ª are associated. This portion of the mechanism also carries the brackets 110 and 111 for the guide and feed sprockets for the films.

In Figures 30 and 31 a modified arrangement of the obturator shutter and the screen is illustrated. In this construction the screen and two obturating shutters are mounted in a common casing 112 provided with apertures 113 and 113ª through which light will be projected. Within the casing is the screen 114 which is of the character indicated in Figure 16. This screen is mounted on the carrier 115 secured to the spindle 116 on which the pulley 117 is mounted and through the intermediary of which the screen may be rotated at an appropriate speed.

Two obturating shutters 118 and 118ª are also arranged within this casing. These are secured respectively to carriers 119 and 119ª. The former is directly driven from the spindle 120 connected through the coupling 121 with the spindle 122 which corresponds with the usual spindle driving the obturating shutter. The spindle on which the carrier for this shutter is mounted is provided with a bevel wheel 123 which in turn drives through the bevel wheels 124 and 124ª, rotatably mounted on the spindle 125, the bevel wheel 126 associated with the carrier for the other obturating shutter. In this way the two obturating shutters are driven in reverse directions; that is, one clockwise and the other counterclockwise.

It may here be mentioned that a device operating in accordance with certain features of my invention was exhibited at the Conversazione of the Royal Society on the 20th June, 1923, and at the meeting of the British Association for the Advancement of Science on the 18th September, 1923.

Having now described my invention what I claim as new and desire to secure by Letters Patent is:—

1. The improved method of securing stereoscopic effects which comprises alternately diminishing and increasing the visibility of the image of one member of a plurality of stereoscopically related views, the limits of speed in effecting such change in visibility being between that which would cause persistence of vision to produce apparent super-position of the images and that causing flicker.

2. The improved method of securing stereoscopic effects which comprises alternately gradually diminishing and increasing the visibility of the image of one member of a plurality of stereoscopically related views while correspondingly alternately gradually increasing and diminishing the visibility of the image of a second member of the plurality of such views, the limits of speed in effecting such changes in visibility being between that which would cause persistence of vision to produce apparent super-position of the images and that causing flicker.

3. The method of securing stereoscopic effects in which stereoscopically related views printed in pairs as prints of equal depth or intensity are employed in conjunction with means adapted gradually to diminish the brilliance of the projected image of one member of the pair and gradually to increase the brilliance of the projected image of the other member, the limits of speed in effecting such change in visibility being between that which would cause persistence of vision to produce apparent super-position of the images and that causing flicker.

4. The method of securing stereoscopic effects in cinematography in which a cinematograph film having stereoscopically related views printed in pairs side by side, as prints of equal depth or intensity, is employed in conjunction with means adapted to diminish gradually the brilliance of the projected image of one member of a pair and increase gradually the brilliance of the projected image of the other member, the limits of speed in effecting such change in visibility being between that which would cause persistence of vision to produce apparent super-position of the images and that causing flicker.

5. The method of securing stereoscopic effects which comprises gradually rendering one of a pair of stereoscopically related views more distinctly visible and correspondingly reducing the visibility of the other member without ever completely suppressing either of the two views unless also the other view is suppressed, the limits of speed in effecting such change in visibility being between that which would cause persistence of vision to produce apparent super-position of the images and that causing flicker.

6. The method of securing stereoscopic effects in cinematography involving the gradual transition of one member of a pair of stereoscopically related views into the other member, in which a film or films is exposed (to obtain simultaneously right- and left-hand images) within the usual limits of speed of travel of the film through the camera and the resultant positive film is caused to travel within the usual range of speed through the projector, which comprises securing the diminution of visibility of the right-hand views and the increase in visibility of the left-hand views and vice versa during the passage of a relatively considerable number of sections of the film through the gate of the projector, the limits of speed in effecting such change in visibility being between that which would cause persistence of vision to produce apparent super-position of the images and that causing flicker.

7. The method of securing stereoscopic effects which comprises the projection of three representations of each view, one of the views being that seen by the left eye, the other the view seen by the right eye and the other such as would be seen by an eye located in a position between the right- and left-hand eye and varying the visibility of the successive left- and right-hand views while the intermediate view is projected with a constant intensity, the limits of speed in effecting such change in visibility being between that which would cause persistence of vision to produce apparent super-position of the images and that causing flicker.

8. The method of securing stereoscopic effects in cinematography in which the transition from one member to another of stereoscopically related views is secured progressively so that from the moment when the first member is fully visible it fades away, while the other member is rendered increasingly visible by reason of its increase in intensity of illumination, the limits of speed in effecting such change in visibility being between that which would cause persistence of vision to produce apparent super-position of the images and that causing flicker.

9. Apparatus for securing stereoscopic effects comprising means whereby light may be projected through the pair of stereoscopically related views and means adapted to secure the alternate diminution and increase in the visibility of the projected image of one member of the pair while alternately increasing and diminishing the visibility of the projected image of the other member of the pair, the limits of speed in effecting such change in visibility being between that which would cause persistence of vision to produce apparent super-position of the images and that causing flicker.

10. Apparatus for securing stereoscopic effects which comprises means for projecting light through a diapositive comprising a pair of stereoscopically related views and a screen of graduated opacity for securing the alternate diminution and increase in intensity of illumination of one of the pair while increasing and diminishing the intensity of illumination of the other member of the pair, the limits of speed in effecting such change in visibility being between that which would cause persistence of vision to produce apparent super-position of the images and that causing flicker.

11. Apparatus for securing stereoscopic effects in projected images comprising means whereby pairs of stereoscopically related views may be supported between a projector lens and a source of light and a screen rotatably mounted and provided with arcuate bands of graduated opacity so disposed relatively to the projector lens as by its rotation simultaneously to diminish the intensity of light passing through one member of a pair of stereoscopically related views and correspondingly increase the intensity of light passing through the other member, the limits of speed in effecting such change in visibility being between that which would cause persistence of vision to produce apparent super-position of the images and that causing flicker.

12. Projection apparatus comprising a source of light, means whereby successive pairs of stereoscopically related views may be brought into position to secure projection of light therethrough and means whereby the intensity of light passing through one member of a pair of stereoscopically related views is diminished and the intensity of light passing through the other member of the pair is increased, the limits of speed in effecting such change in intensity of light being between that which would cause persistence of vision to produce apparent super-position of the images and that causing flicker.

In testimony whereof I have signed my name to this specification.

DEMETRIUS LEONIDA DAPONTE.